Jan. 27, 1959     A. R. EGGENSPERGER ET AL     2,871,462

INFORMATION DISPLAY DEVICES

Filed Oct. 5, 1955     11 Sheets-Sheet 1

INVENTORS
ARLO R. EGGENSPERGER
DANIEL E. FOLEY
BY *John Attall*
ATTORNEY

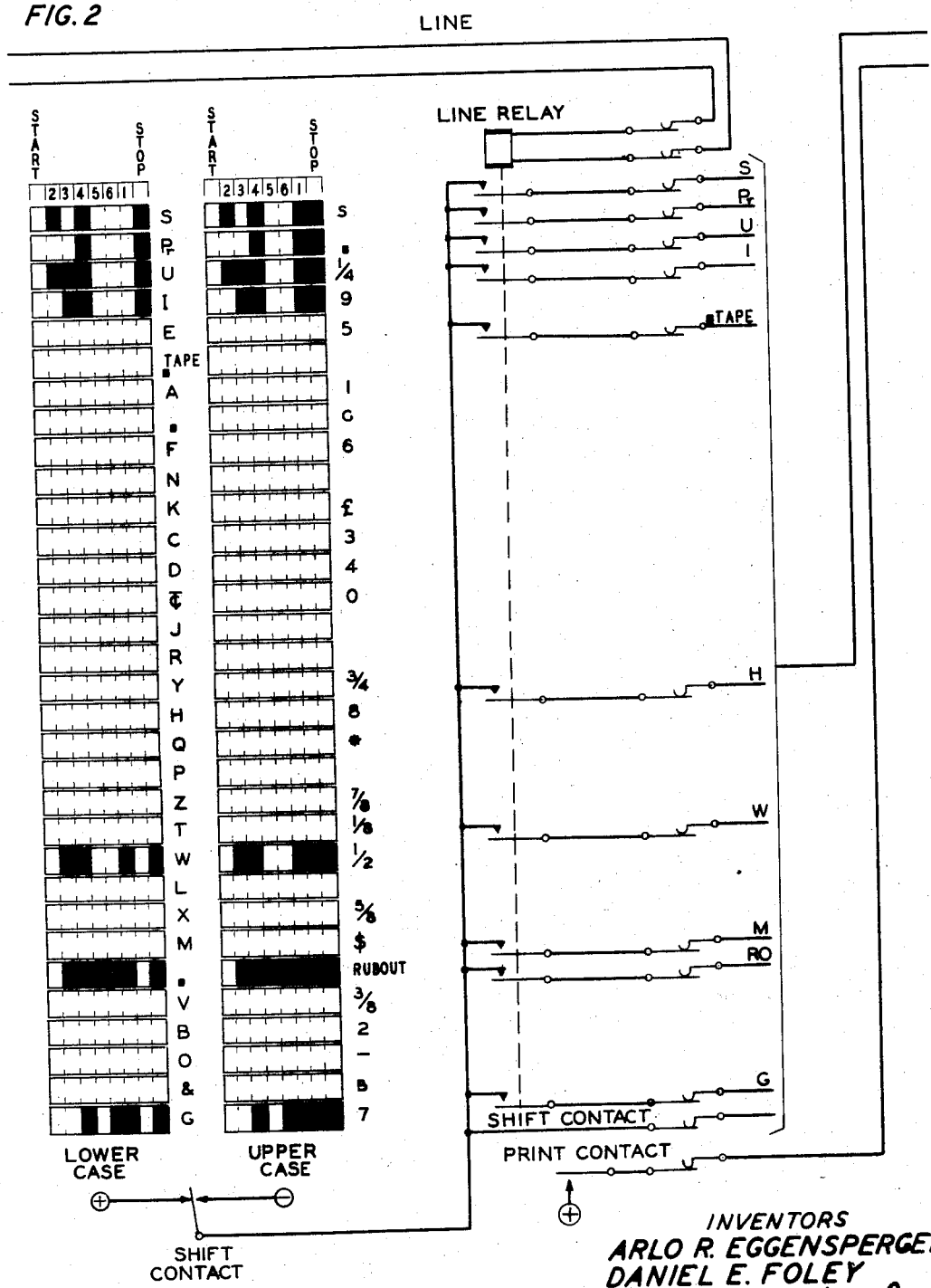

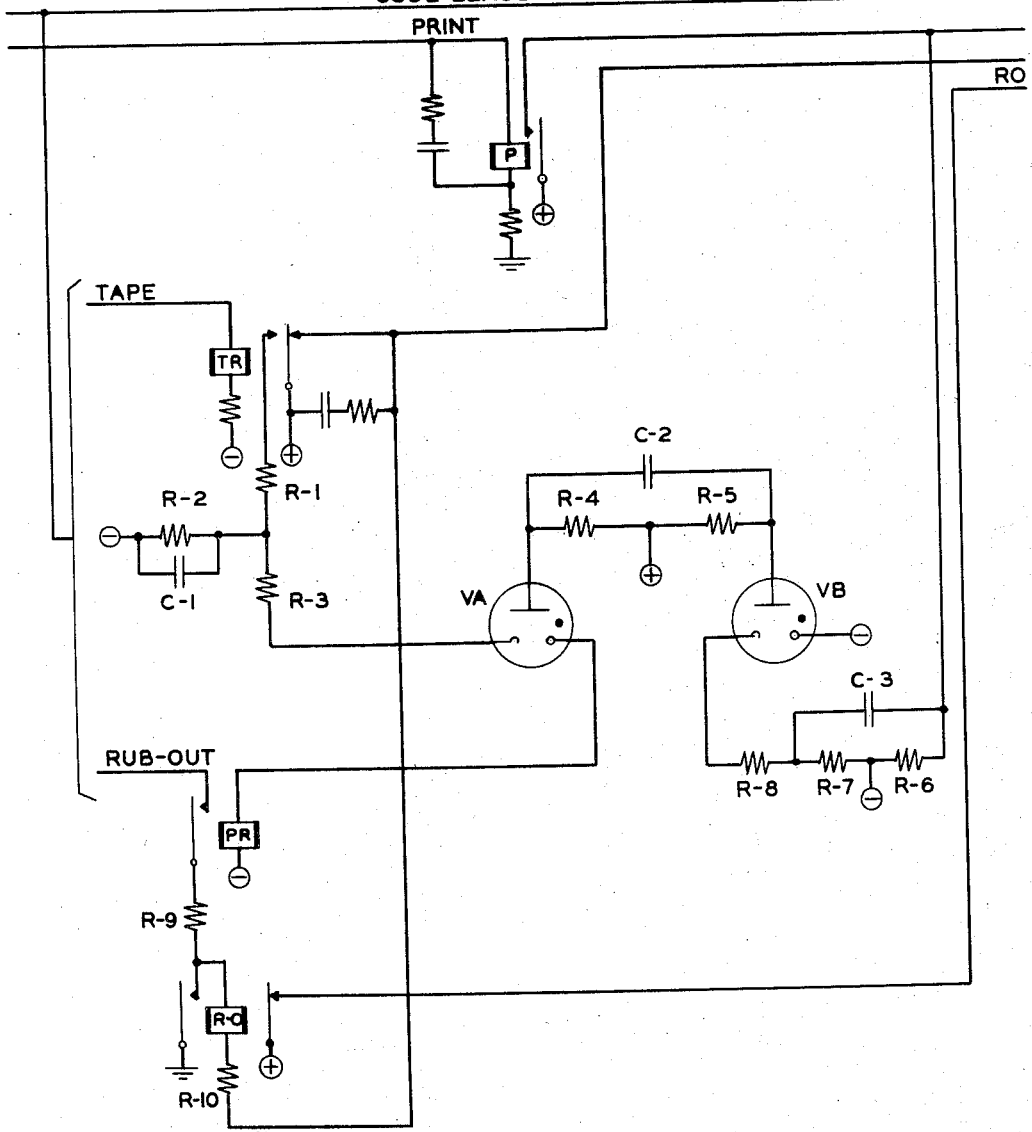

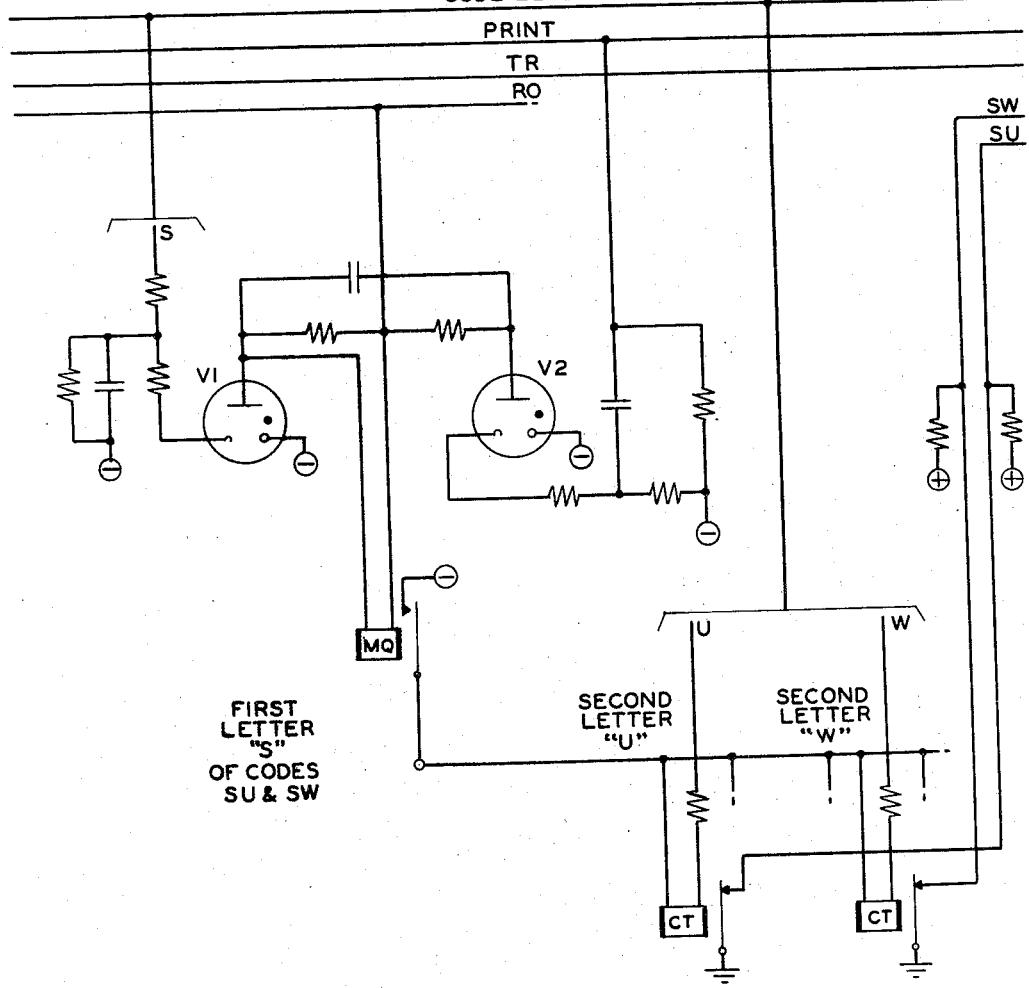

QUOTATION ALTERNATOR

Jan. 27, 1959   A. R. EGGENSPERGER ET AL   2,871,462
INFORMATION DISPLAY DEVICES
Filed Oct. 5, 1955   11 Sheets-Sheet 8

INVENTORS
ARLO R. EGGENSPERGER
DANIEL E. FOLEY
BY John A. Hall
ATTORNEY

Jan. 27, 1959    A. R. EGGENSPERGER ET AL    2,871,462
INFORMATION DISPLAY DEVICES

Filed Oct. 5, 1955    11 Sheets-Sheet 9

DISPLAY UNIT

INVENTORS
ARLO R. EGGENSPERGER
DANIEL E. FOLEY
BY
ATTORNEY

# United States Patent Office 2,871,462
Patented Jan. 27, 1959

2,871,462

INFORMATION DISPLAY DEVICES

Arlo Raleigh Eggensperger, Tenafly, and Daniel Elmore Foley, Nutley, N. J., assignors to William Francis Hogan, New York, N. Y.

Application October 5, 1955, Serial No. 538,650

5 Claims. (Cl. 340—154)

This invention relates to market quotation systems and more particularly to the automatic display of quotations of prices of stocks or commodities traded on any one of a number of different exchanges.

It is desirable to exhibit the prices of the commodities, stocks, or other items traded on the exchange in various brokers' offices, an object not generally heretofore realized because of the cost and complication of the apparatus necessary. In the past it has been customary to provide large and complicated display boards which show the previous close of the commodity or stock, the high and low and last price, and means for automatically changing these various display items and prices of each of the stocks and commodities in question. Such prior art automatic display boards are large, costly, and expensive to maintain.

It has been conventional to provide ticker service, that is, a printing mechanism on a transmission line over which scattered items of information in a number of categories might be printed on a tape. It has been conventional for a person wishing to know the most recent information in a particular category to scan that portion of the tape issuing from the ticker backwards over previously printed information until he could mentally assemble the pertinent facts, but this was time consuming and particularly it was available to but a single person at a time.

A feature of the present invention is a device which will respond to the same signals supplied to the tickers and which will automatically assemble and display the latest information in all the categories in which a ticker service cutsomer might be interested. The display will be on a sufficiently large scale to serve a fair sized audience.

A feature of the invention is that the display board may be of any desired size and equipped to provide price quotations on any desired number of stocks or commodities, from one to the complete number handled by the ticker service. The device of the present invention is capable of handling the output of a plurality of ticker service circuits.

In the conventional ticker service it is usual to scatter other items of information among those constituting price quotations and hence to prevent the erroneous operation of some one of the display devices by the fortuitous simulation of a quotation code, among these other items of information, an on and off switching device is provided which turns the receiving circuit off when an item of information constituting matter other than a quotation is about to be transmitted and which in its body might contain a pair of letters constituting a commodity code.

The present invention therefore consists of a device which operates directly from a normal ticker circuit, which is automatically enabled to receive items of information and, of those received, to select and display only predetermined ones.

In accordance with this invention an improved and simplified commodtiy exchange system is provided wherein only the last and next to the last quotations are displayed.

A further object of this invention is to display the last quotation alternately on either one of two display arrays for each of the commodities or stocks traded in and to indicate by means of an auxiliary indicator lamp which one of the two display arrays of lamps or indicators shows the last quotation. In this manner, the amount of equipment at the broker's office is greatly reduced and its maintenance simplified and thus rendered less expensive.

Another feature of this invention relates to using the normal ticker service supplied to the broker's office for conveying information on the prices of the commodities or stocks traded in to actuate and control the display equipment of the present invention, thus obviating the need for special transmission required for the larger and more complicated devices employed heretofore or the translation to any special coding for the remote control of registers.

Another feature of this invention relates to gaseous discharge display devices wherein each of the digits of each display is by means of a gas discharge tube. Each of these tubes has a plurality of cathodes each comprising a fine wire bent into the form of a letter or number and arranged in a number of parallel planes normal to the axis thereof and a common anode. The cathodes may be selectively energized so that when so energized they will by means of the conventional cathode glow exhibit the numeral desired. Such gaseous discharge tubes have been called "Inditrons" and are described in greater detail in a patent application of F. Maynard, Serial Number 420,366, filed April 1, 1954, now Patent No. 2,756,366, dated July 24, 1956.

Another feature of this invention is the use of a display device consisting of a stack of plastic discs each having an Arabic numeral etched thereon which is made to glow by the application of light to the edge of the disc. When ten of these discs are closely packed any one of the digits 0 to 9 may be displayed within the confines of a small area by lighting any one of ten lamps. Such display devices are conventional and applicants make no claim to the device alone.

The choice of one or another of these display devices depends on the size of the apparatus unit. If such a unit is small and is adapted for a limited number of commodity quotations and is practically for viewing by an individual, then the cathode glow lamps may be employed, but if larger display numerals are required as when the device will be viewed by a group of brokers or customers then the edge lighted etched plastic pile up may be used. It is to be noted that the latter may vary in size so that the commodity quotation display cabinet may be fabricated to suit the broker's need.

Another feature of this invention relates to the use of a non-typing telegraph selection mechanism for controlling the display of the quotations of various commodities on the display board or system. Suitable types of non-typing selectors are shown in United States Patent 2,120,235, granted to Beattie et al., June 4, 1938, and United States Patent 2,112,234, granted March 29, 1938, to Beattie et al.

Another type of conventional telegraph selector is the so-called ticker which has been modified by the removal of its type wheel and the provision of a contact operated by each of its stop-pins. Such a device is shown in a large number of patents among which the Dirkes et al. Patent 1,951,570, issued March 20, 1934, and the Dirkes et al. Patent 2,023,952, issued December 10, 1935, may be noted.

A feature of the invention relates to the use of certain control signals preceding the various categories of items of information, a special signal being used before the matter which is not to be quoted. This is known as the rub-out signal. A key on the keyboard of the perforator used by the operator who prepares the punched tape for transmission known as "Tape" operates to advance the tape, so that it is conventional for this operator to use this key before punching any codes. If then the first item of information constitutes a quotation, then he records this and following quotations in a normal manner. If, however, the item of information is not to be quoted, he operates the rub-out key, so that a tape code followed by a rub-out code constitutes a no-quote signal. If at the end of such item of information (which might be a news item) the operator then wishes to resume quotation of commodity prices, he may advance the tape several steps and he does this by operating the "tape" key. Thus the receipt of the code for "tape" which is not followed by the rub-out code constitutes a signal to enable the code translators.

Still another feature of the invention is the use in the code translator circuits of a common first letter translator. Where, by way of example, a plurality of commodities are designated by two letter codes each of which has the same first letter, then but a single first letter translator is employed, there being an individual second letter translator for each.

A feature of the invention is a means for automatically posting various length quotations. Ordinarily a quotation consists of a two letter code followed by a four digit price quotation and a counting means is provided to subject the four digital places in the display unit to the number code leads so as to register the four digits of the quotation in turn. Usually these four digits represent dollars, cents, and fractions, so that the display of the four digits 1975 would actually represent one dollar, ninety-seven and five-eighths cents, and while printed on the ticker tape as 197⅝, would be understood by the brokers to mean $1.97⅝. Very often the fraction is left off entirely so that the four place counting means does not reach the normal end of its operation, in which case it is stepped along by the following letter code without the registration of a numeral in the last or fourth place of the display unit. A feature of the invention may then be stated as a means for automatically advancing the operation of the display means when less than the full number of codes is received to fill the spaces provided for the quotations.

Other features will appear hereinafter.

The drawings consist of eleven sheets having fifteen figures, as follows:

Fig. 2 shows the essential circuits of a conventional type ticker having a single make contact operated by each of its stop-pins, a universal or print contact and a transfer contact responsive to the type, upper case or lower case, of code received and showing to one side and in alignment with the said contacts a representation of both the upper and lower case codes;

Fig. 3 is a schematic circuit diagram showing the so-called No-Quote circuit which will respond to that series of codes which precedes items of information other than strictly market quotations, to disable the code translators both to prevent them from responding to codes fortuitously included in such items of information and to cut down useless and unnecessary operation thereof;

Fig. 4 is a schematic circuit diagram showing a code translator or a circuit, which enabled by the No-Quote circuit, will respond to a two character identification code, a common first letter component and two second components being shown;

Figure 12:
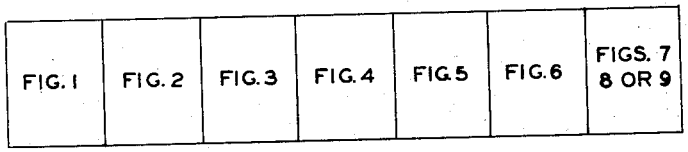
Figure 13:
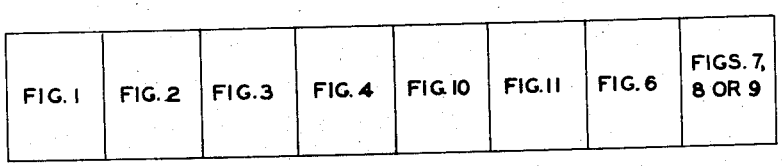
Figure 14:
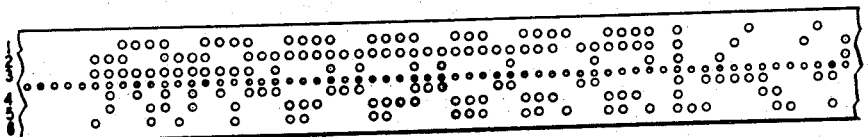
Figure 15:
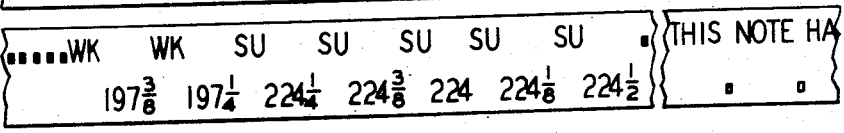
Figure 14A:
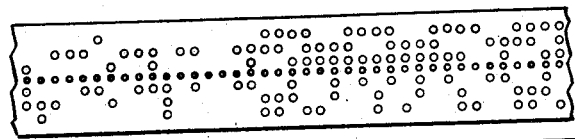
Figure 15A:
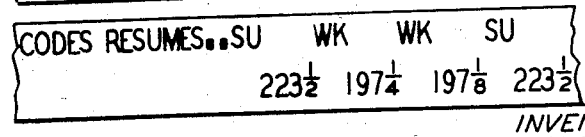
Figure 5:
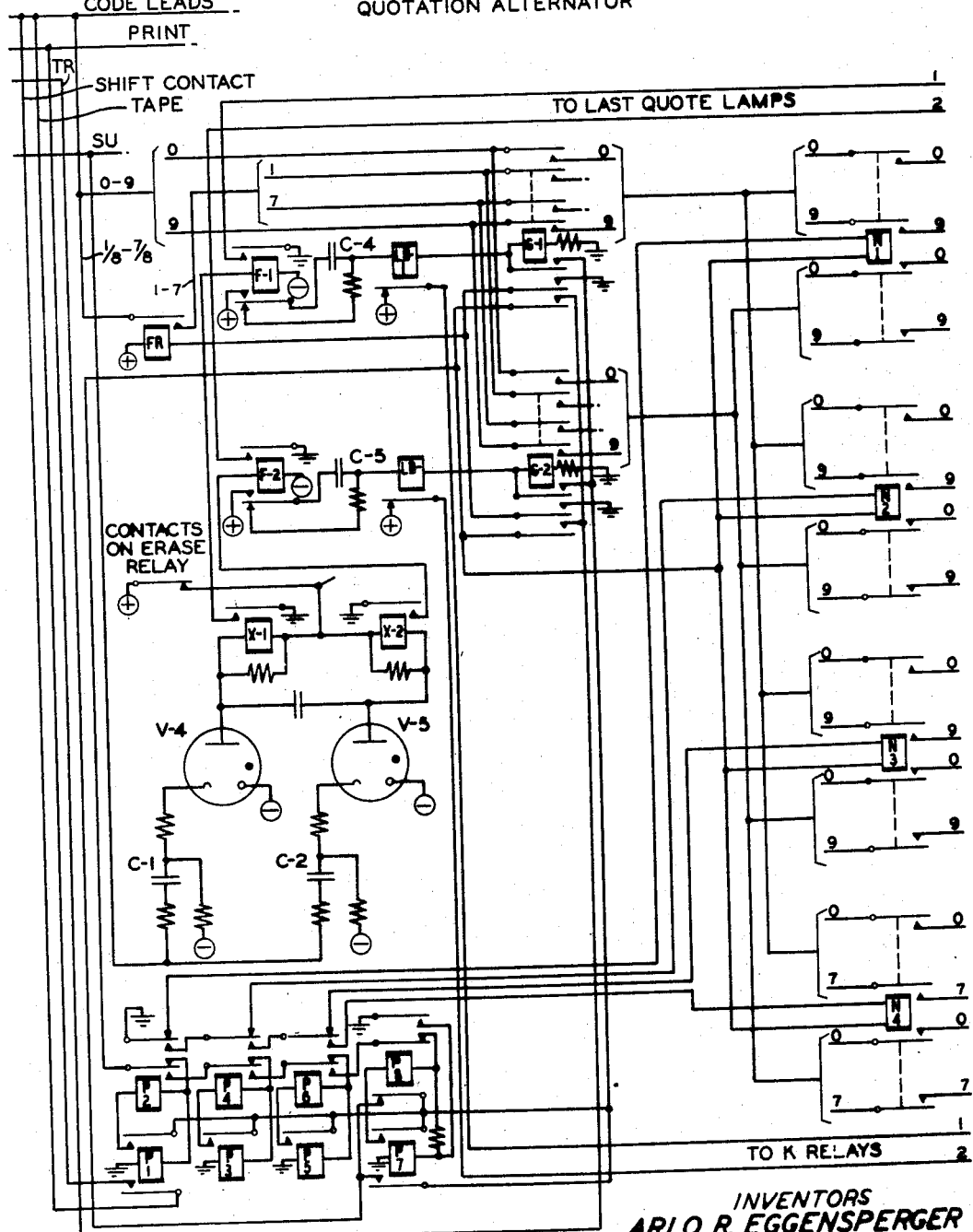
Figure 6:
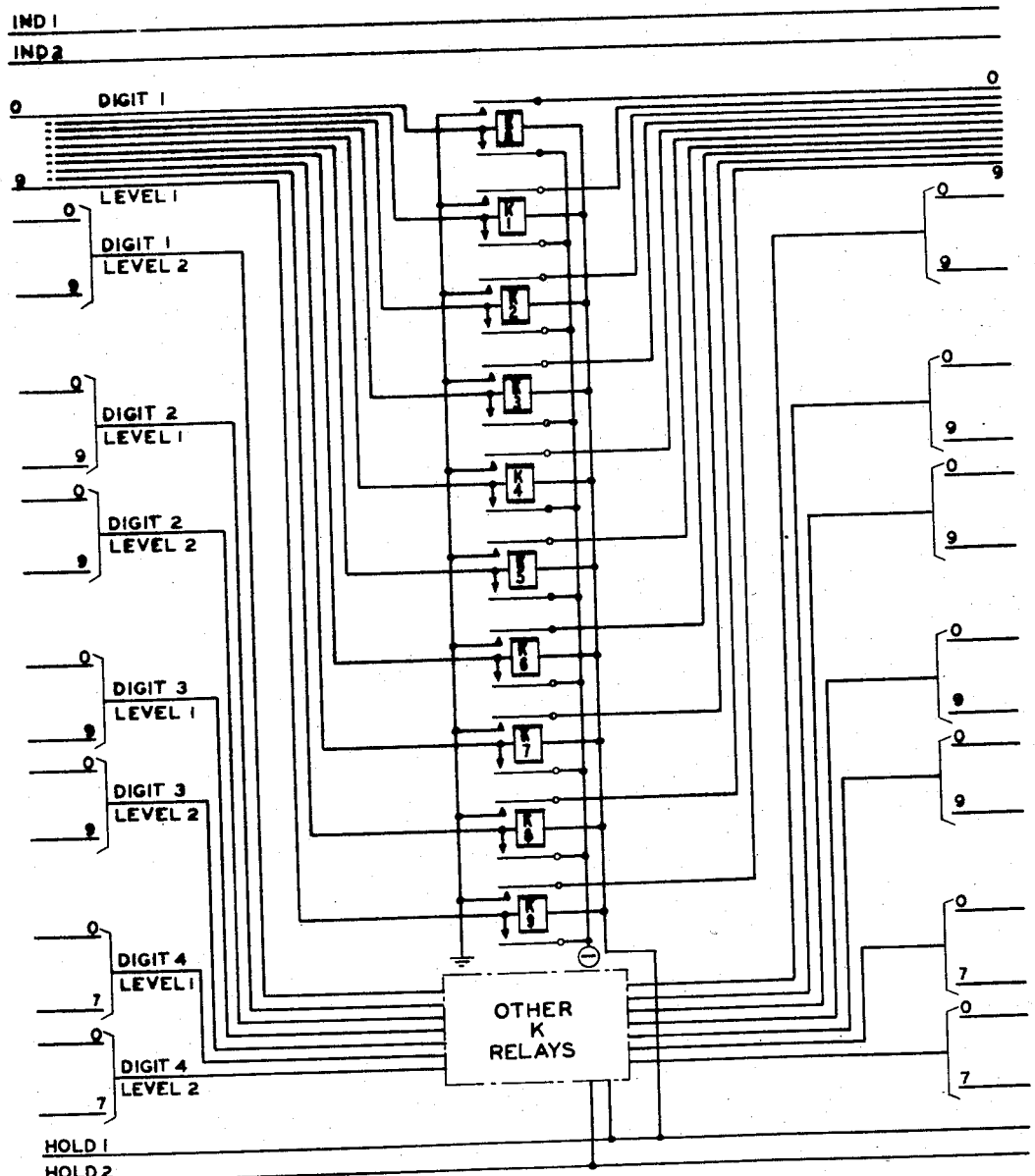
Figure 7:
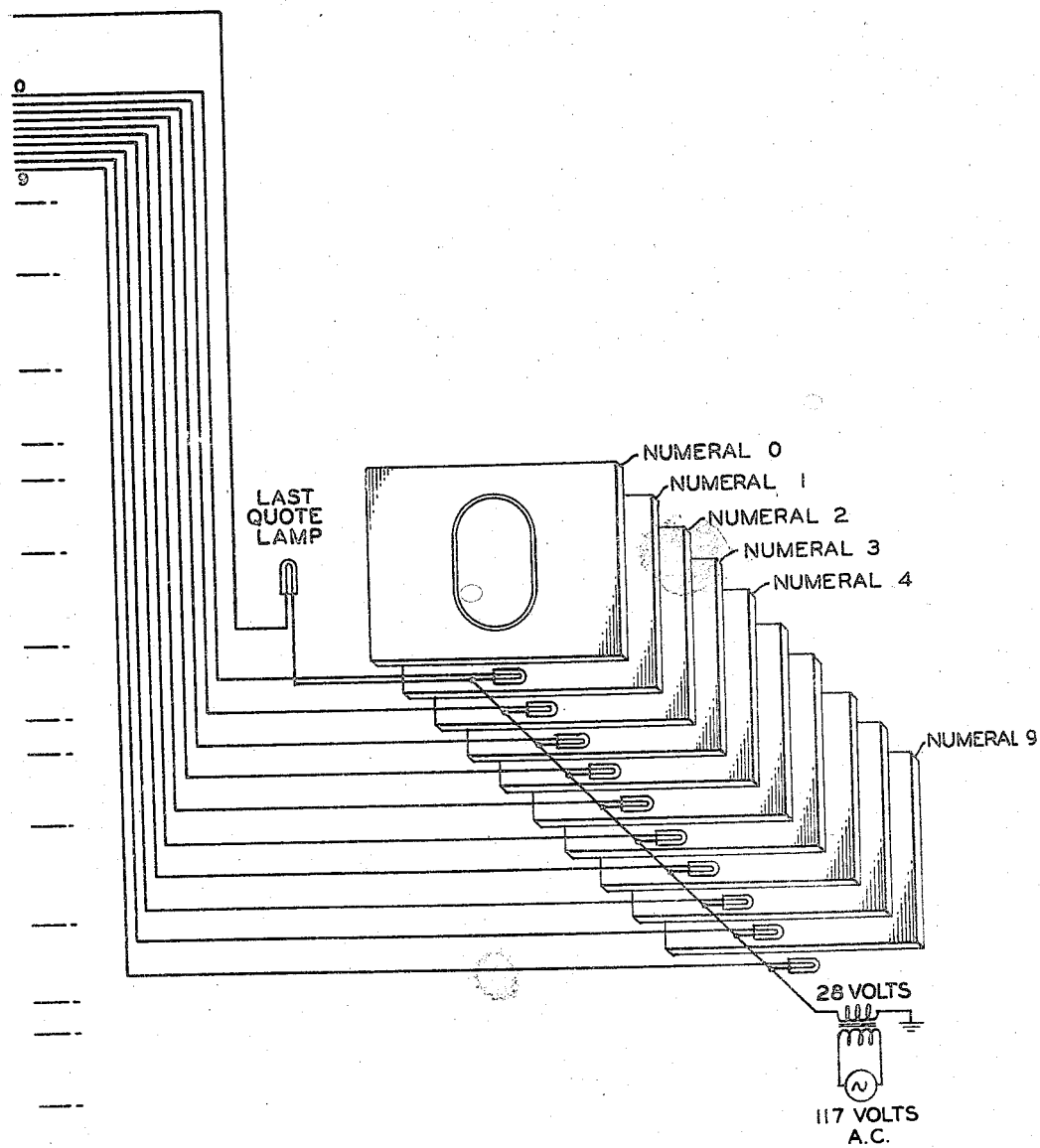
Figure 8:
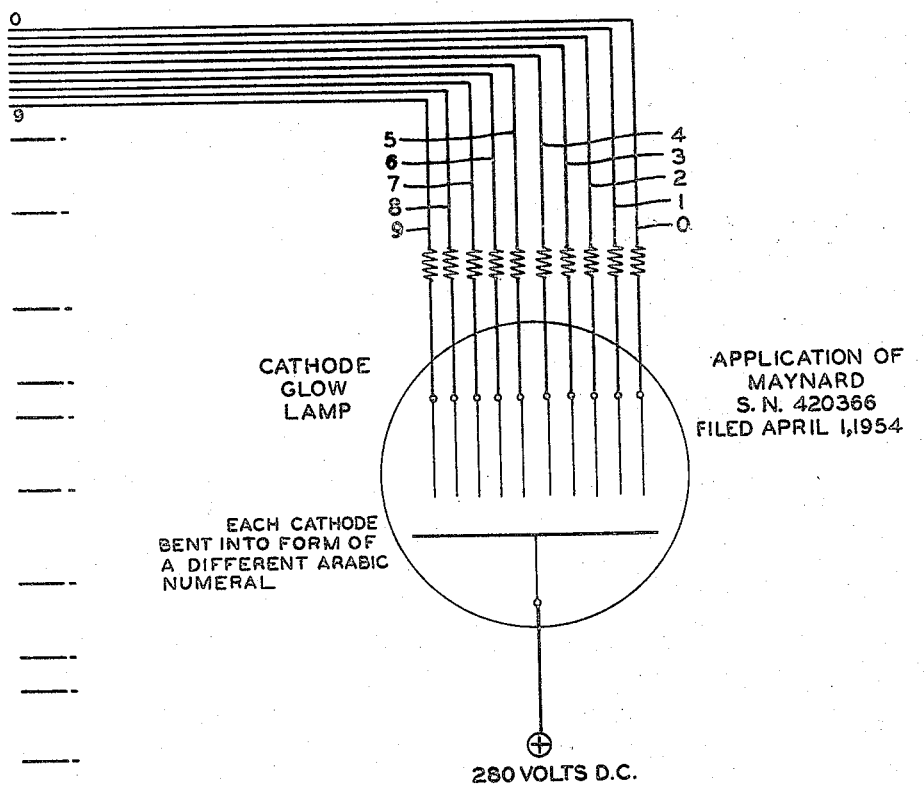
Figure 9:
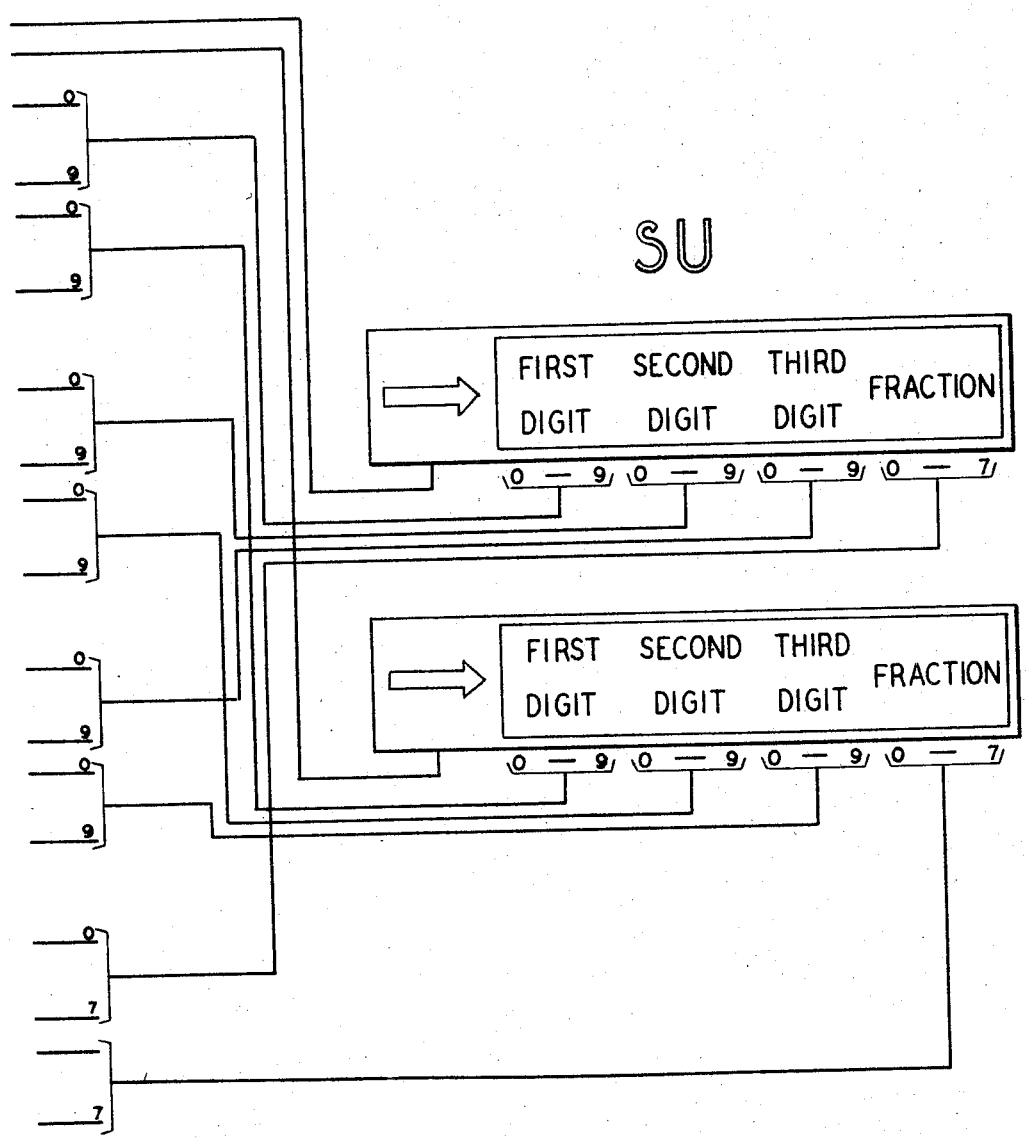
Figure 10:
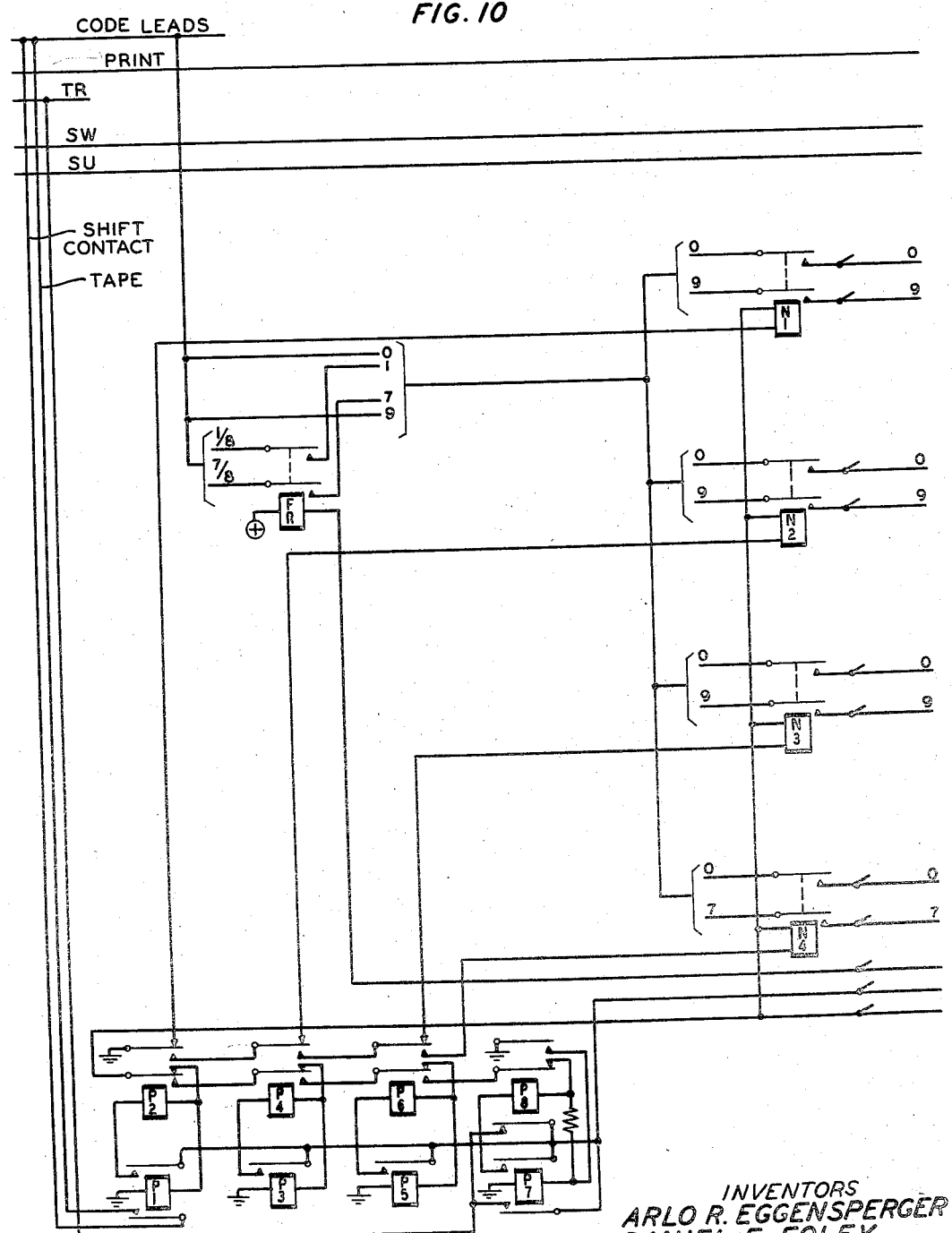
Figure 11:
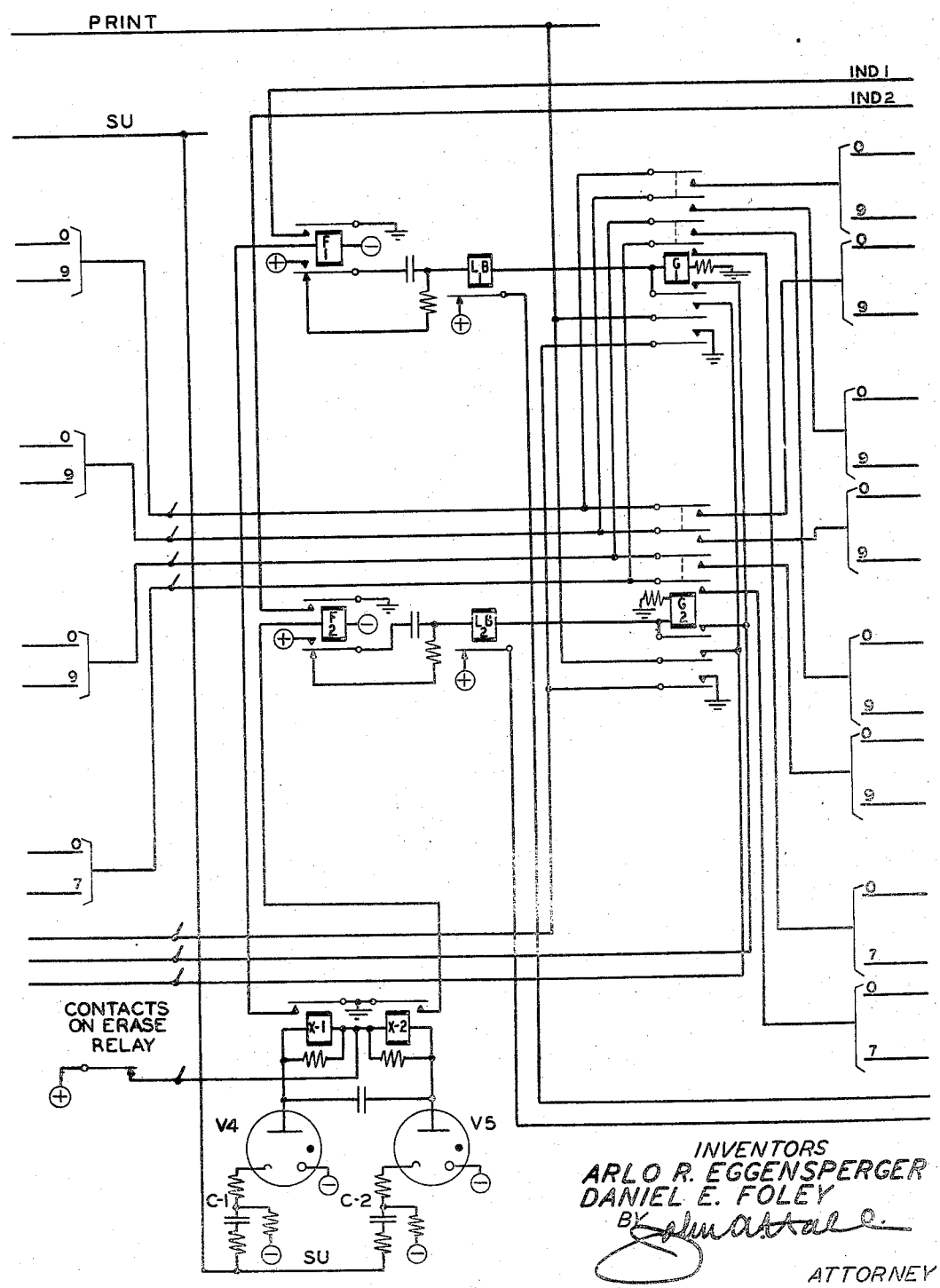

Fig. 5 is a schematic circuit diagram showing a quotation alternator, that is a circuit arrangement whereby a quotation being received is automatically routed to that one of the two display units provided for each coded commodity which contains the eldest quotation so that such eldest quotation may be erased, the present quotation recorded therein and the last quotation indicator associated therewith activated;

Fig. 6 is a schematic circuit diagram showing one set of digital register relays and indicates the remaining seven sets for one quotation display device, on which set of relays a single digit of the quotation may be registered to remain there until as part of an eldest quotation it is released to make way for the latest quotation;

Fig. 7 is a partly schematic circuit diagram and a partly exploded view of a pack of etched plastic discs showing how a small lamp (hidden in actual practice) is placed so as to provide light at the edge of a disc, such discs in practice being closely packed and viewed in a line normal to their faces, so that when one of the lamps is lighted the pack will appear to display the particular numeral etched in that disc whose edge is illuminated;

Fig. 8 is a schematic circuit diagram showing the connections made to a cathode glow lamp in which any one of ten cathodes in the form of fine wires each bent into the shape of a different Arabic numeral may be selectively activated;

Fig. 9 is a diagram partly in circuit schematic and partly in block form showing the connections from a single code translator to a display unit consisting of two number windows each having means for displaying four digits and a last quotation indicator lamp in the form of a pointing arrow;

Fig. 10 is a schematic circuit diagram which together with Fig. 11 shows an arrangement alternative to the Quotation Alternator of Fig. 5 and in which Fig. 10 shows circuits and apparatus common to a large number of individual quotation alternator circuits;

Fig. 11 is a schematic circuit diagram showing the individual quotation alternator part of the circuit of Figs. 10 and 11 taken together;

Fig. 12 is a block diagram showing how Figs. 1, 2, 3, 4, 5 and 6 and any one of Figs. 7, 8 or 9 may be placed to make a complete circuit diagram of one form of the invention;

Fig. 13 is a block diagram similar to that of Fig. 12 but with Figs. 10 and 11 substituted for Fig. 5 to make a complete circuit diagram of another form of the invention;

Fig. 14 is a representation of a section of the punched tape prepared on the perforator which is used on the transmitter, and which shows a number of quotations and an item of information which will operate the No-Quote circuit and which contains the fortuitous simulation of a commodity code which is, nevertheless, unable to operate the corresponding quotation display device; and Fig. 15 is a section of ticker tape produced by a ticker responding to the codes transmitted by the tape of Fig. 14.

The device of the present invention is a means for directly displaying items of information being transmitted in code over the well known ticker service circuits. The device may be inserted in such a line and will operate without disturbing the tickers being served. It produces a luminous display of the last and the next to last quotations in any given commodity or group of commodities. It may be used to display the quotations on one, several, or the complete list of commodities quoted by the ticker service. It will reject items of information and quotations of all nature except the commodities for which it has been particularly arranged.

Figure 1:
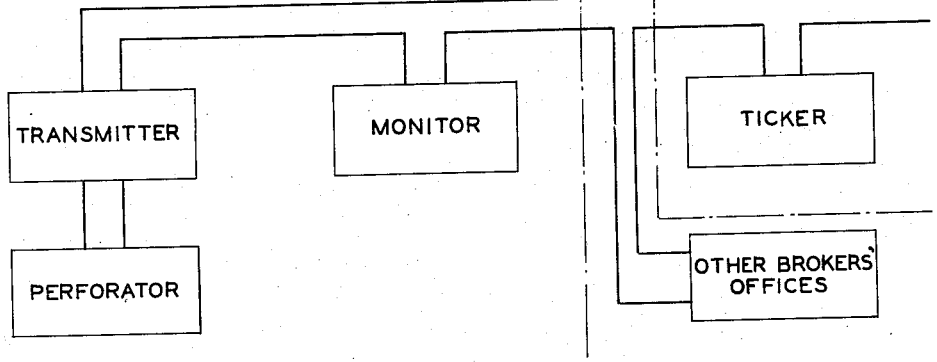
Fig. 1 is a schematic circuit diagram showing the conventional organization of a ticker service circuit including the perforator, transmitter and monitor at the originating office, the circuit extending to a plurality of brokers' offices and extending into the next figure to indicate the source of information handled by the device of the present invention.

In Fig. 1 there is a schematic showing of a perforator, a transmitter, and a monitor serving a ticker service circuit issuing from an originating office and extending to a plurality of brokers' offices, some of which are indicated in Fig. 1 and another of which is shown in detail in the remaining sheets of drawings. The transmission over this circuit will be a steady stream of codes, such as are shown in Fig. 2. Generally speaking, each group of quotations or items of information constituting commodity identification and price quotation is preceded by the code for "tape" and each other item of information, such perhaps as a news item, is preceded by the codes for "tape" and "rub-out."

The selector

The selector employed and shown in Fig. 2 may be of any conventional design that will respond to the transmission over the ticker service line. That shown is a modified ticker known as an editing ticker and which will respond in exactly the same manner as the tickers included in that circuit excepting that the type wheels have been removed and an individual contact has been arranged for operation by each stop-pin while the mechanism conventionally used to effectively differentiate between the two type wheels has now been used to connect a source of positive potential to the stop-pin contacts for lower case codes and a source of negative potential for upper case codes. From the code charts shown in Fig. 2 it will thus appear that the entirely blank lower case code known as "Tape" will provide a connection through the "Tape" contact from a source of positive potential, while the RO (Rub-Out) contact will provide a connection to a source of negative potential. Many of the letter codes are used for commodity identification and the ten Arabic numerals and the seven fractions are used for price quotations. In actual practice the fractions are translated to the number of eighths which such fraction represents as the numeral 3 for the fraction ⅜ and the numeral 4 for the fraction ½ and so forth.

The operation of the circuits will now be described one at a time.

No-Quote circuit

The "No-Quote" circuit is a flip-flop circuit devised to respond to certain codes to go to one condition and remain there indefinitely regardless of a steady stream of codes being received and to respond to another certain code to go to another condition and remain there indefinitely in like manner. In the arrangement illustrated herein, by way of example, the No-Quote circuit will respond to the two codes Tape and Rub-Out received successively and will operate a relay RO to open a circuit constituting the main supply of potential to the display units so that so long as this relay RO remains operated no one of the display units may be operated. Since all items of information other than actual quotations are preceded by these two codes Tape and Rub-Out the No-Quote circuit will respond thereto and disable the plurality of display units.

The No-Quote circuit will also respond to the single code for "Tape" to establish its alternative stable state in which the main potential supply circuit to the display units is closed by the RO relay. The first item of information constituting a quotation following a non quoted item is preceded by the code for "Tape."

The No-Quote circuit operates as follows. Let us assume that the No-Quote code, "Tape" followed by "Rub-Out" is received. Normally the tube VB is conducting because the P relay operates on every character received by the ticker and hence is continuously acting to disable or extinguish the tube VA. Assume that the Print contact has released and as a result the relay P is also released and that the last character received was something other than "Tape" so that the relay TR was in its normal non-operated state. Thereupon, when the character "Tape" is received a corresponding stop-pin contact will be closed and the relay TR will be operated. The character "Tape" is a lower case code so that the shift contact is moved to apply positive potential over the Tape contact of the Editing Ticker and thence to the TR relay permanently connected to a source of negative potential. It is to be noted that the same stop-pin is never operated in the upper case as this code in upper case is blank, but if this should in some manner become inadvertently operated the negative potential applied to the TR relay would have no effect since the TR relay, as stated, is permanently connected to the source of negative potential.

Upon the movement of the armature of this relay, a circuit is closed from the source of positive potential over resistance R-1 to condenser C-1 whose other terminal being permanently connected to the source of negative potential will become charged. Until the condenser C-1 becomes charged, the potential supplied by the armature of relay TR through resistances R-1 and R-3 to the firing cathode of tube VA does not rise to a sufficient value to cause the firing of this tube.

Normally, tube VB is conducting so that the potential on its plate has been pulled down and condenser C-2 is charged to a potential constituting the full positive value on its left plate (connected to the plate of tube VA) and this lowered value on the plate of tube VB.

Condenser C-1 will charge in approximately 2 milliseconds whereupon the tube VA fires and the main anode to cathode circuit becomes active and conducts current from the source of positive potential, resistance R-4, the path through tube VA and the winding of the PR relay to the source of negative potential resulting in the operation of this relay.

In firing, the potential of the plate of tube VA drops and thus effectively applies a negative pulse to the plate of tube VB which results in the extinguishing of that tube whereupon condenser C-2 will recharge through the resistance C-5 to prepare the tube VB for reoperation. It takes approximately ten milliseconds to attain a high enough potential on the plate of tube VB to sustain main anode to cathode conduction if tube VB is re-fired.

Tube VB will be re-fired in about twenty-five milliseconds after tube VA was fired. The firing of tube VB is caused by the closure of the Print contacts on the ticker and the consequent energization and operation of the relay P. The Print contacts remain closed about thirty milliseconds during which time the tube VB is fired on the application of positive potential to the condenser C-3 and thus over resistance R-8 to the firing electrode of the tube VB. In about ten milliseconds the condenser C-3 becomes charged through the resistance R-7 so that the potential on the firing electrode of tube VB is reduced to a value below the required firing potential.

Conduction in the main anode circuit of tube VB causes a change in the voltages applied to condenser C-2. Prior to the operation of relay P the right hand plate of this condenser was at the full positive potential supplied through resistance R-5 and the left hand plate was held at a reduced potential due to conduction in tube VA (the main anode voltage drop of tube VA). When the tube VB fires, the left hand plate of condenser C2 drops and tube VA is extinguished. Relay PR releases. Since relay TR is being held operated from the tape stop-pin contacts on the ticker, positive potential is being applied to the VA tube control electrode condenser C-1. Condenser C-3 dropped to less than the firing potential of tube VB about ten milliseconds after the operation of relay P and at about the same time the left hand plate of condenser C-2 reached a positive potential sufficient to sustain conduction of the main anode cathode circuit of tube VA. Therefore, at the end of about ten milliseconds (relay TR remaining operated) tube VA re-fires and extinguishes tube VB through the action of condenser C-2 as hereinbefore described. Relay PR is reoperated. Thus even though relay P may still be operated, tube VB cannot be re-fired, except by a release and a reoperation of the relay P. When the stop-pin contact operation on the ticker has been completed following receipt of the Tape character, the flip-flop will always stop oscillating with tube VA conducting and tube VB non-conducting. Relay PR remains operated, conditioning relay RO to operate when the Rub-Out character providing it immediate follows the Tape character.

Assuming now that the Rub-Out character immediately follows. The Tape stop-pin contacts on the ticker break and the TR relay releases, applying positive potential to the lower terminal of the RO relay. Thereafter the Rub-Out stop-pin contacts on the ticker are closed and since the Rub-Out character is an upper case character the shift contacts will be operated to supply a negative potential and hence such negative potential will be applied through the front contact of the PR relay, the resistance R-9 to the top terminal of the RO relay. This relay operates and locks through its left hand armature and front contact and will remain so locked until the TR relay is again operated.

The RO relay in operating opens the circuit for supplying positive potential to the main anodes of the display circuit tubes.

It is to be noted that shortly after the RO relay has been operated, the print contact is operated, the P relay is operated, the tube VB is fired, and the tube VA is extinguished, thus releasing the PR relay. At the conclusion of the Tape-Rub-Out code which causes the operations just covered, the No-Quote circuit comes to rest with the tube VB conducting and the relay RO operated. Tube VA is non-conducting and relay PR is released and this condition will be steadily maintained until the relay TR is again operated. Throughout this period the print contacts will be operated on each and every code but this merely acts to fire the VB tube, which being conducting remains in this condition.

When the circuit is thrown back to display by the receipt of a Tape character (not immediately followed by a Rub-Out character), the No-Quote function will be released by the operation of the relay TR. Because the relay TR drives tube VA, the VA tube will fire on this operation also and relay PR will operate as before. Upon the operation of the TR relay, the RO relay is released and since this code is not followed by the Rub-Out code it will not be reoperated even though the PR relay is momentarily operated. Thereafter the print contacts are closed, the relay P is operated, the tube VB is fired, and the tube VA is extinguished. The circuit will remain in this stable state indefinitely until a new valid No-Quote code is received and the relay RO being released, the display circuits will be enabled.

*Code translator circuit*

The code translator circuit, of which there may be an indefinite number as desired, is a circuit having three incoming conductors, one for the first letter of the code, a second for the completing letter of the code, and a third for the print contact. The first and second letter conductors may be multipled to any stop-pin contacts desired. Thus, if the first letter conductor is connected to the S stop-pin contact and the second letter conductor is connected to the U stop-pin contact (both lower case) this particular code translator circuit will respond to the SU code.

There are two tubes in a flip-flop circuit which respond to the first letter of the code and a relay (CT) which will respond to the second letter of the code only immediately after the receipt of the first letter. No completing letter circuit will respond unless enabled by the flip-flop circuit activated by the first letter.

The flip-flop action between tubes V1 and V2 is the same as the action between the tubes VA and VB of the No-Quote circuit. Tube V2 is fired by the print contact and deionizes the V1 tube but V1 re-fires and deionizes tube V2 when the S stop-pin contact is operated simultaneously with the print contact. Therefore, when the character "S" is received, the positive potential on the S conductor triggers the V1 tube and leaves it conducting so that the MQ relay will be left operated when the S contacts break. The print contact will relieve this condition on the first subsequent character other than another "S." Relay MQ, operated, prepares a negative battery termination through the CT relay.

Where a number of code translator circuits all respond to codes having the same first letter, the MQ relay may prepare the CT relays of all the second letter circuits in parallel whereby that one which responds to a particular completing code letter will operate.

The "U" stop-pin contacts on the ticker close ahead of the print contacts and this causes the CT relay to operate. The main function of the CT relay is to remove ground from the single outgoing conductor of the code translator circuit extending to the control electrode condensers of the Quotation Alternator which will be described hereinafter.

About twenty-five milliseconds after the relay CT operates, the print contact closes, whereupon positive battery is applied to the firing electrode of the V2 tube and results in the firing of this tube. This extinguishes the V1 tube and releases the MQ relay and, in turn, the CT relay.

The sequence of operations is as follows:
(1) The "U" stop-pin contacts close.
(2) Relay CT operates.
(3) Tube V1 is extinguished.
(4) Relay MQ releases.
(5) Relay CT releases.

When relay CT releases and restores ground to the control electrode condensers connected to the back contact of its right hand armature, the capacity kick of these Quotation Alternator condensers causes the flip-flop in that circuit to operate, which in turn opens the gate for the succeeding digits of the quotation as explained hereinafter.

The above described operations of this code translator enable Quotation Alternator to respond to the digits 0 to 9 and the representations of the fractions ⅛ to ⅞ from the ticker leads to the proper level of lamps associated with the particular item selected by the code translator. It will be shown hereinafter that the FR and either the G-1 or G-2 relays will remain up for the following four operations of the ticker. At the end of the fourth operation, relay P-8 in the digit stepping circuit operates to release these relays and at that time the three or four digit price quotation will be registered in the display lamp circuits and these numbers will continue in display until the second quotation following causes a repetition of the action just described. (The first quotation following will cause similar action but will be directed to the alternate level of display lamps.) The G-1 or G-2 relay and the FR relay can be released also by a tape character which operates relay TR, this feature being provided so that the operator may correct a quotation when an error is made.

The function of the Code Translator may be summarized as follows. When the stop-pin contacts of the ticker or any other selectively operated contacts are operated in the sequence corresponding to the assigned code, the Code Translator operates momentarily to pulse the Quotation Alternator. Timing is important in this pulsing function and it is therefore placed under control of the print contact since this does the counting and causes registration from this point on and is used as the reference in the sequence. Therefore, following the release of the print contact in its operation at the time the second code letter is registering, the Quotation Alternator is triggered. Consequently, the gate to admit digits to the associated lamp circuits is opened during the release of the print contact between its excursions in cooperation with the last code letter and first digit in the sequence. This arrangement provides adequate time for gate circuit operation and proper timing which prevents clipping the first digit, or pulsing incorrectly due to the second code letter being recognized as a stepping pulse.

It should be noted that the connection in the code translator circuit at the armature of the MQ (multi-quote) relay constitutes a common multiple point to which other second letter responsive circuits may be connected. For example, if there were five other codes having S as their first letter, the Code Translators for these five would consist of a single flip-flop circuit (tubes V1 and V2 and relay MQ) and five second letter circuits all connected in multiple to the armature of the MQ relay and each being responsive to a different stop-pin contact as illustrated. This arrangement permits equipment associated with the first letter to be used for all codes in a given commodity, such as the 6 trading months for wheat, WK, WZ, WN, etc.

The stop-pin ticker contacts of S and U may be connected as either first or second letters of other code translators since the high impedance charging circuits in which these contacts work permits random connections without interference or other adverse effects.

The winding of the P relay, shown in the No-Quote circuit is shunted by a condenser and resistance circuit to provide some delay and marking bias. This bias is required to insure a pulse sufficiently long to operate the digit stepping relays.

The Quotation Alternator

The Quotation Alternator circuit shown in Fig. 5 controls the gate relays (G–1 and G–2) which steer the integers and fractions of the quotation to the lamp circuit of the particular item being quoted. The alternator also switches the quotations to first one level of lamps and then another (there may be more than two levels if a more accurate "trend" is desired), and causes the "Last Quote" lamp to continuously indicate the last quotation. During the switching operations the lamps which are glowing in the level to be used for the new quotation are extinguished and then conditioned to be fired. In the circuit of Fig. 5 the individual flip-flop circuit responsive to the incoming code such as SU is associated with an individual set of stepping relays and an individual set of number relays, whereas in another embodiment of the invention shown in Figs. 10 and 11 the stepping relays and number relays are common and the gate relays increased to switch a larger number of circuits.

The flip-flop circuit in the Quotation Alternator is basically the same circuit as that used in the No-Quote and the Code Translator circuits. The Control electrode condensers, however, are pulsed from a common lead, that is the code lead from the CT relay of the Code Translator circuit. The main anode circuit impedance of the tube V–4 is less than the main anode impedance of F–5. This unbalance eliminates the probability of both tubes firing on the first triggering action following deactivation and insures that at that time the tube V–4 will fire. (Deactivation is controlled by contacts on the Erase Relay.)

Activation in the Code Translator when the two associated code letters are sensed by the ticker in sequence causes the particular CT relay to operate so as to pulse the individual (SU) code lead extending to the flip-flop tube circuit in the quotation alternator. The contacts of the CT relay charge the trigger circuit condensers associated with the tubes V–4 and V–5 and this will cause the extinguished tube to fire which in turn extinguishes the other tube, the transfer taking place when the relay CT releases and restores ground on the then charged condensers. The tubes remain in this state until this same code is sensed by the ticker on a subsequent operation at which time the code translator pulses the quotation alternator again and the condition of tubes V–4 and V–5 will reverse.

Assuming that a code (SU) is received and that the flip-flop causes relay X–1 to operate and X–2 to release, relay X–1 will then cause the operation of relay F–1. Relay F–1 operated, drives the LB–1 and G–1 relays up by the condenser kick on the charging of condenser C–4. Relay G–1 locks up to positive battery supplied over its front contact and inner lower armature and the lower armature and back contact of the P–8 relay to the back contact and armature of the TR relay in the No-Quote circuit. The G–1 relay will thus lock up long enough to connect the digit and fraction leads to the inputs of the N–1 to N–4 distributing relays but will be released on the final operation of the P–1 to P–8 counting relays or the next operation of the TR relay.

A circuit is provided from the shift contact of the ticker (see Fig. 2) through a front contact and armature of the P–1 relay (see Figs. 5 and 10) to the "tape" lead so that if the usual four digit quotation is shortened, even to a one digit quotation, then the TR relay in the No-Quote circuit (Fig. 3) will be pulsed and this will result in the release of the counting relays and the gate relays whereby the circuits are prepared for the next quotation.

Relay LB–1 operates momentarily, which first removes positive battery from the locking circuit of the K relays (Fig. 6) to erase the display of the eldest quotation and then restores this battery so that on the immediately following operation thereof these K relays will lock. This causes the windows of this display array to go dark just prior to registration of the integers and fractions which follow. Relay G–1, operated, causes the operation of relay FR which functions to translate the fractions into corresponding integers. It may be noted that since such integers are commonly used instead of fractions which are printed by the tickers.

The quotation alternator has now opened the gate to connect the stop-pin contact leads from the ticker through to the level of the display array associated with the LB–1 and the G–1 relays. From this point on, as the N–1 to N–4 relays are pulsed on successive operations of the ticker print contact by way of the P relays, they connect the stop-pin contacts through to the lamp circuits. The operated stop-pin contact corresponding to the integer or fraction selected on that particular operation will cause that number to register by the operation and locking of a corresponding K relay (Fig. 6), and the operated K relay will in turn enable the corresponding display lamp.

Following the fourth operation of the print contact, Relay P–8 in the digit stepping circuit operates and opens the positive battery lead (TR—from back contact of relay TR) whereby relay G–1 and thereby relay FR are released. The counting relays P–1 to P–7 inclusive have operated in turn and locked to this positive battery but when relay P–8 operates it short circuits relay P–7 so that the counting relays as well as the gate relays are released. Relays X–1 and F–1 remain operated in the V–4 tube circuit, relay F–1 holding ground on the last quote lamp lead to keep this lamp in glow.

When the next code is sensed by the ticker the Code Translator again triggers the Quotation Alternator but this time the tube V–5 fires and tube V–4 is extinguished. Similar action as described takes place except that all the action is now in the circuit associated with the second level of the display unit.

It is to be noted that the operations herein described are the same for both embodiments of the invention, the purely individual circuit of Fig. 5 or the circuit using common components (Fig. 10) shown in the combination of Figs. 10 and 11 as these two embodiments are indicated in Figs. 12 and 13 respectively.

Digit stepping circuit

The digit stepping circuit shown both in Fig. 5 and Fig. 10 is used to advance the digits from place to place in the display array in unison with the receipt of the respective digits by the ticker.

Relays P–1 to P–8 constitute a counting circuit which counts Print contact operations of the ticker. The counter is started after the Quotation Alternator is operated by receipt of a code and the gate is thereby opened to permit the digits to be carried through to contacts on the N–1 to N–4 relays.

After the quotation alternator flip-flop has operated the print lead is extended by an operated G–1 or G–2 relay to the junction leading in one direction to the N relays and in the other direction to the counting relays. The first operation is the energization of the N–1 relay and the P–1 relay. The P–1 relay closes the circuit for the P–2 relay but this is short circuited until the print contact opens whereupon P–2 operates and advances the circuit, releasing the N–1 relay and preparing for operating the N–2 relay.

During the operation of the N–1 relay the selected stop-pin contact corresponding to the first digit of the quotation will be connected to the corresponding K relay which operates and locks to enable the corresponding display lamp.

When the print contact operation ends, relay N–1 is released and relay N–2 is enabled, for operation on the next closure of the print contacts. Thus on four successive closures of the print contact the N–1 to N–4 relays are successively operated and the four digits or characters of the quotation are registered.

The release of the print contact on its excursion in cooperating with the fourth stop-pin contact causes relay P–8 to operate and since this shunts relay P–7 the positive holding battery from relay TR is removed whereby the counting relays and the gate relays are released. All these relays are released and the stepping circuit is restored to its starting point. The registration of the quotation remains locked in the display unit by the locked up K relays and these will not be released until another quotation seeks to come into the level, at which time the pulsing of relay LB–1 or LB–2 removes the holding battery on the K relays.

Digit registration circuit

There is a set of K relays for the registration of each digit as shown in Fig. 6. This is a simple circuit whereby one of the ten relays is selectively operated through the corresponding contacts of the N relays under the arrangement of Fig. 12 and the contacts of the G relays under the arrangement of Fig. 13. Holding ground is supplied by the corresponding LB relay which is momentarily pulsed on the operation of the flip-flop circuit of tubes V–4 and V–5.

The display units

The display units may be of any desired nature which may be operated by the output leads of the K relays. Fig. 7 indicates a stack or pile up of engraved plastic discs made to glow by small lamps mounted to illuminate the edges thereof. Fig. 8 shows the essential elements of a cathode glow lamp called an Inditron in which one of its cathodes made of fine wire bent into the shape of a corresponding Arabic numeral is made to glow. Fig. 9 is an indication of the connections made to the four digit display areas and the last quotation lamp for each of the two display arrays (there may be more than two arrays) of a display unit. The device of the present invention will include from one to a large number of these units depending on the requirement of the broker. Each will have its corresponding code plainly displayed in association therewith.

General arrangements

Fig. 14 is a representation of the punched tape prepared on the perforator which is then placed in the transmitter for transmission over the ticker service circuit, and Fig. 15 is the record produced thereby on a ticker. Attention is called to a series of five entirely blank codes at the start (reading from left to right) and the printing by the ticker or five square dots in the upper level (actually lower case). These are five "tape" codes produced by the operator by pressing the tape key. Thereafter there are six quotations (items of information), five of which contain a two letter identification code, a three number and a fraction and one which contains no fraction and, therefore, contains only three numerical codes instead of the usual four. This shows that no wrong operation is caused even when the counting relays are not completely operated within this particular item of information.

Following the end of these six quotable items of information a note "This note has been preceded by a No-Quote signal which causes the device to ignore any code combinations appearing herein. With transmission of the quote signal, recognition of codes resumes." is inserted. The No-Quote signal is "Tape" followed by "Rub-Out." In the punched tape the Tape signal is an entirely blank code and this causes a square dot in the upper level to be printed by the ticker. The Rub-Out signal is a completely filled code (six mark signals) and this produces no result in the ticker so it cannot be found therein. At the end of this non quoted item of information the operator has advanced the tape two steps as can be seen from the two entirely blank codes printed on the ticker tape as square dots in the upper level before the following quotable items of information.

Attention is called to the fact that the normal "space" code (mark signals in places 1 and 4) produces a square dot in the lower level of the typing. This is normal and conventional, the purpose being to check that the space between words in the upper level are not wrong operations of the ticker. Attention is also called to the fact that one code used herein, by way of example, is the code SU. This also appears in the body of the word "resumes" but since this item of information has been preceded by the No-Quote signal, it does not result in any operation of the display means.

What is claimed is:

1. An information display device for displaying information transmitted in a long series of groups of codes in which items of information in a given category are scattered among items of information in other categories, each item of information in said given category containing identification codes followed by information codes, an on and off circuit responsive to one particular code to switch said circuit off and responsive to an additional code to switch said circuit on, a plurality of display units, each consisting of a double set of display lamps and an indicator for each said set of display lamps to indicate the last set of lamps to have been operated, means operative in the off position of said on and off circuit responsive to identification codes for selecting a given one of said display units and means within said selected unit thereafter responsive to information codes for automatically selecting, releasing, and operating the eldest operated set of display lamps and for releasing said indicator lamp associated with the other said set of lamps and for operating said indicator lamp associated with said eldest operated set of lamps.

2. An information display device for displaying information transmitted in a long series of groups of codes in which items of information in a given category are scattered among items of information in other categories, each item of information in said given category containing identification codes followed by information codes, an on and off circuit responsive to one particular code to switch said circuit off and responsive to an additional code to switch said circuit on, a plurality of display units, each consisting of a double set of display lamps and an indicator for each said set of display lamps to indicate the last set of lamps to be operated, means operative in the off position of said on and off circuit responsive to identification codes for selecting a given one of said display units, means within said selected unit thereafter responsive to information codes for automatically selecting, releasing, and reoperating the eldest operated set of display lamps and for operating the indicator lamp associated therewith, and means for releasing the previously operated indicator whereby both sets of display lamps will remain operated to give information while but one of said indicators will be operated.

3. An information display device for inclusion in a ticker circuit and responsive to the transmission of information thereover, consisting of means for selecting items of information in predetermined categories and for displaying said selected information in each said predetermined category on a duplicate set of display devices, one displaying the last and the other the next to last item of information received over said circuit, an indicator for each said set of display devices for indicating which of said devices contains the last item of information in each said category and means responsive to the receipt of a later item of information in a said category for substituting said later item of information in said display devices for said next to last item of information and for alternating the operation of said indicators.

4. An information display device for displaying information transmitted as a series of items in code suitable for the working of conventional telegraph tape printers, consisting of a two part display unit for each category of information, means for routing said items of information to corresponding units, means for displaying the last quotation in each category alternately on the said two parts of the corresponding display unit and for maintaining the next to last quotation alternately on the other of the said two parts of the display unit and means for indicating the last quotation received in each said unit.

5. An information display device for displaying information transmitted as a series of items in code suitable for the working of conventional telegraph tape printers, each said item of information containing an identification code followed by a multidigit information code, a plurality of display devices each consisting of two multidigit display units and each display unit having a plurality of display areas, a number of lamps equal to the the number of characters to be displayed in each said area, means responsive to said identification codes for selectively enabling said display devices, gating means for automatically enabling one or the other of said units and for successively enabling said areas, said lamps being selectively responsive to said information codes and a last-quote indicator for indicating the unit within each said display device last operated.

References Cited in the file of this patent

UNITED STATES PATENTS

| | | |
|---|---|---|
| 1,978,094 | Smith | Oct. 23, 1934 |
| 1,983,905 | Hoover | Dec. 11, 1934 |
| 2,074,423 | Peterman | Mar. 23, 1937 |
| 2,142,106 | Boswau | Jan. 3, 1939 |
| 2,260,116 | Hicks | Oct. 21, 1941 |
| 2,288,645 | Quinby | July 7, 1942 |